United States Patent [19]

Newell et al.

[11] Patent Number: 5,050,725
[45] Date of Patent: Sep. 24, 1991

[54] FEEDSCREW SYSTEM AND METHODOLOGY

[75] Inventors: Arthur B. Newell, Santa Ana; Dwain M. Gipson, Corona, both of Calif.

[73] Assignee: Label-Aire Inc., Fullerton, Calif.

[21] Appl. No.: 428,121

[22] Filed: Oct. 27, 1989

[51] Int. Cl.$^5$ .............................................. B65G 47/26
[52] U.S. Cl. .................... 198/444; 198/464.3; 198/464.4; 198/467.1
[58] Field of Search .................. 198/460, 464.2–464.4, 198/467.1, 625, 675, 572, 575, 577, 444, 459; 156/362, 363, 566, DIG. 12, DIG. 25, DIG. 27

[56] References Cited

U.S. PATENT DOCUMENTS

| | | | |
|---|---|---|---|
| 2,940,630 | 6/1960 | Carter | 156/DIG. 12 |
| 3,738,891 | 6/1973 | Pusching et al. | 156/363 |
| 3,908,815 | 9/1975 | Carter | 198/464.4 |

*Primary Examiner*—Joseph E. Valenza
*Attorney, Agent, or Firm*—Gordon L. Peterson

[57] ABSTRACT

A feedscrew system includes a conveyor for moving articles, at least one feedscrew for spacing the articles, a first sensing arrangement for sensing the occurrence of a gap between any two adjacent articles as the articles move toward the feedscrew, and control components responsive to the first sensing arrangement for controlling the rate at which the feedscrew operates in order to maintain a jam-feed condition. The control components may be configured to reduce the rate at which the feedscrew operates and/or to disengage a clutch in order to stop the feedscrew. A second sensing arrangement may be included in order to delay clutch disengagement when a second conveyor at the exit end of the feedscrew is engaging the top portion of an article within the feedscrew. The method of controlling the feedscrew system includes the steps of providing the first sensing arrangement and controlling the rate at which the feedscrew means operates in response to the first sensing arrangement sensing the occurrence of such a gap in order to maintain a jam-feed condition, and the step of controlling the rate at which the feedscrew operates may include reducing the rate from a normal to a reduced rate and/or stopping the feedscrew.

18 Claims, 1 Drawing Sheet

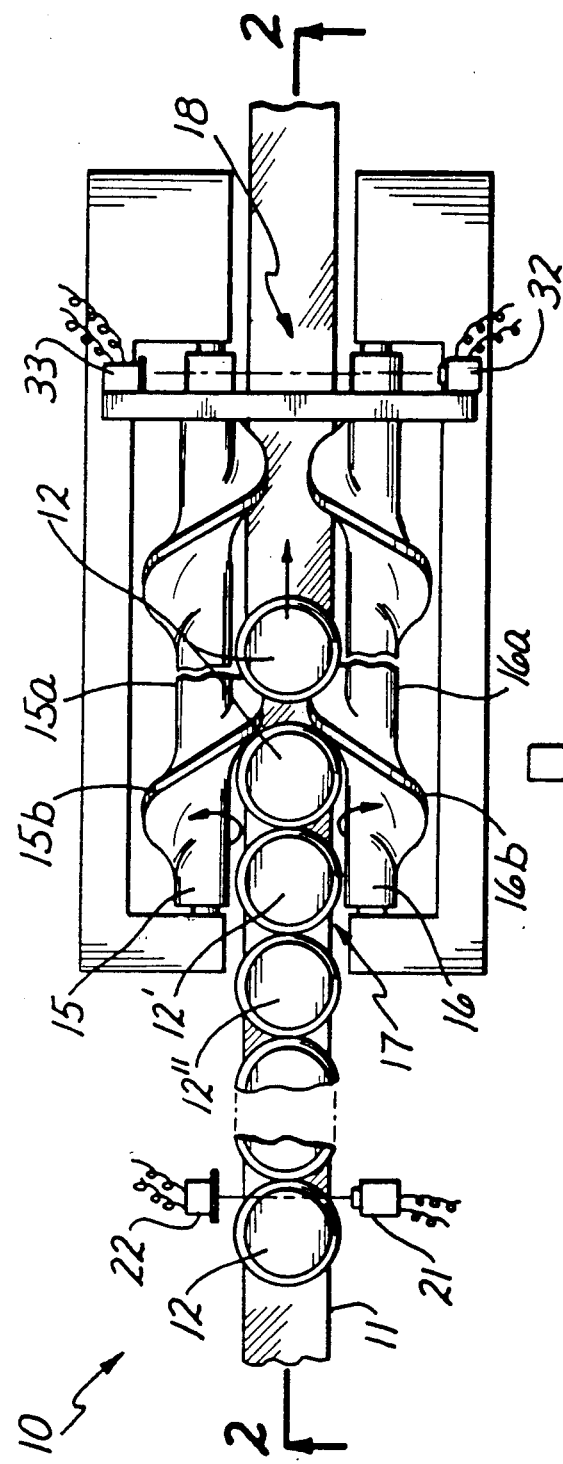
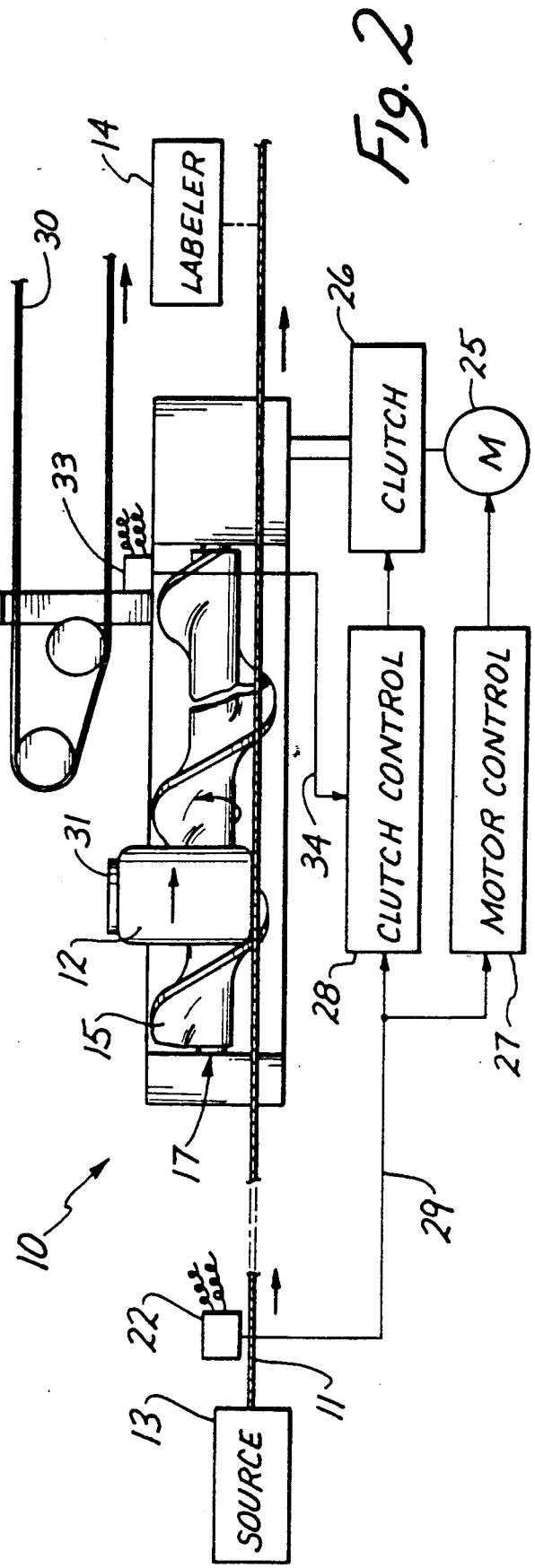

FEEDSCREW SYSTEM AND METHODOLOGY

BACKGROUND OF THE INVENTION

1. Technical Field This invention relates generally to conveyors such as those used to convey articles toward a label applicator, and more particularly to a feedscrew system for controlling the movement of articles along the conveyor.

2. Background Information Some feedscrew systems control the movement of articles along a conveyor in order to maintain the spacing desired for subsequent processing. In the case of label application, for example, the articles move along the conveyor into the entrance end of a pair of parallel feedscrews that are located above the conveyor in a position ahead of a label applicator. As the feedscrews rotate, they capture the articles in the valleys of the two feedscrew threads so that the articles leave the exit end of the feedscrews with spacing that conforms to the threads, just right for the label applicator.

However, there are certain problems with existing feedscrew systems that need to be overcome, such as the ability of the feedscrew threads to damage articles as the articles pass into the entrance end. Such damage can occur when one of the articles reaches the entrance end at a time that results in it becoming trapped between crests of the feedscrew threads instead of being captured in the valleys. When that occurs, the crests can compress the article sufficiently to damage it.

That problem can be reduced by jam-feeding the feedscrews (i.e., maintaining a line of abutting articles at the entrance to the feedscrews). Doing that helps because there are always articles ready to enter the feedscrews and the article that was the last to enter the entrance of the feedscrews holds back the article that is next in line to enter in such a way that it will not become trapped between the crests. However, a gap in the line of articles being supplied to the feedscrews can frustrate jam-feeding attempts so that the threat of damage remains.

Gaps can occur simply because the labeling rate is a little faster than the supply rate or for various other reasons associated with operation of the source of articles, the gaps sometimes being managed by blocking the movement of articles toward the entrance end of the feedscrews whenever a gap is sensed. Some sort of restraining mechanism may be activated for that purpose to act as a dam across the conveyor, and as soon as the articles catch up so that a jam-feed condition is restored, the dam is removed to unblock movement so that the articles can once again enter the feedscrews.

However, when using the damming technique, movement must be unblocked at just the right time so that movement of the first article is properly synchronized with feedscrew rotation. Otherwise the first article may arrive at the entrance end at just the right time to be caught between the crests and, in the case of various containers such as cans and bottles of liquid, even burst by the compression action of the crests. In addition to less efficient processing, that can cause damage to the feedscrew system and the conveyor system as well as injury to attending personnel. Consequently, it is desirable to have a feedscrew system that better alleviates those concerns.

SUMMARY OF THE INVENTION

This invention solves the problems outlined above by providing a feedscrew system in which feedscrew speed is varied to offset the occurrence of a gap in the line of articles being supplied to the entrance end. In that way, the feedscrew system of this invention maintains a jam-feed condition so that damage and injury are less likely.

Generally, a feedscrew system constructed according to the invention includes a conveyor for moving articles from a source of the articles toward a processing station, such as a label applicator, and at least one feedscrew for spacing the articles in order to facilitate processing at the processing station (e.g., the application of pressure sensitive labels). According to a major aspect of the invention, there is provided first sensing means for sensing the occurrence of a gap between any two adjacent articles as the articles move toward the entrance end of the feedscrew. There are also provided control components responsive to the first sensing means sensing the occurrence of such a gap for controlling the rate at which the feedscrew operates in order to maintain a jam-feed condition. The control components may include means for reducing the rate at which the feedscrew operates from a normal operating rate to a reduced operating rate when the occurrence of such a gap is sensed (e.g., by reducing the speed of a drive motor) and/or they may include means for stopping the feedscrew (e.g., by disengaging a clutch coupling the drive motor to the feedscrew).

According to another aspect of the invention, there is provided second sensing means for use in a feedscrew system having a second conveyor located overhead that engages the top portion of the articles as the articles are about to move out of the feedscrew in order to hold the article more firmly for subsequent processing. In order to avoid stopping the feedscrew at a time when an article within the feedscrew is engaged by the second conveyor, means are provided for delaying the stopping of the feedscrew if the second sensing means senses an article in such a position.

In line with the above, a method of controlling a feedscrew system having conveyor means for moving articles and feedscrew means for spacing the articles includes the step of providing first sensing means for sensing the occurrence of a gap between any two adjacent articles as the articles move toward the feedscrew means. The method proceeds by controlling the rate at which the feedscrew means operates in response to the first sensing means sensing the occurrence of such a gap in order to maintain a jam-feed condition.

In that regard, the feedscrew system may include motor means for driving the feedscrew means and the step of controlling the rate at which the feedscrew means operates may include reducing the speed of the motor means. In addition, the feedscrew system may include clutch means for coupling the drive motor to the feedscrew means and the step of controlling the rate at which the feedscrew means operates may include disengaging the clutch means in order to stop the feedscrew means. Furthermore, the feedscrew system may include second conveyor means for engaging a top portion of each of the articles as each of the articles moves out of the feedscrew means, and the step of controlling the rate at which the feedscrew operates may include delaying disengagement of the clutch means when the top portion of an article within the feedscrew is engaged by the second conveyor means until the article is out of the feedscrew.

The foregoing and other objects and features of the invention and the manner of attaining them will become apparent and the invention itself will be best understood by reference to the following description taken in conjunction with the accompanying illustrative drawings.

BRIEF DESCRIPTION OF THE DRAWINGS

FIG. 1 of the drawings is a diagrammatic representation of various components of a feedscrew system constructed according to the invention as viewed from overhead; and FIG. 2 is a diagrammatic representation of the feedscrew system as viewed from the side.

DESCRIPTION OF THE PREFERRED EMBODIMENTS

Referring now to the drawings, there is shown a feedscrew system 10 constructed according to the invention. Generally, the feedscrew system 10 includes conveyor means, such as a known type of conveyor 11 in FIGS. 1 and 2, for moving articles 12 from a source of the articles, such as a source 13 in FIG. 2, toward a processing station, such as a label applicator 14 in FIG. 2 (i.e., a location after the feedscrews where an operation is to be performed on the articles, such as applying a label). The feedscrew system 10 also includes feedscrew means for spacing the articles 12 on the way to the label applicator 14, the feedscrew means including at least one feedscrew and preferably two feedscrews, such as the feedscrews 15 and 16 that extend from a capture point or entrance 17 of the feedscrews 15 and 16 to a release point or exit 18 (FIG. 1). Those components can be similar in many ways to known conveyors and feedscrews.

In that regard, the feedscrews are located proximate the conveyor 11 in order that the articles 12 can be captured in the valleys 15a and 16a of the feedscrew threads between the crests 15b and 16b (FIG. 1) as the feedscrews 15 and 16 are rotated by suitable known drive components, the conveyor 11 typically maintaining a fixed rate. So captured, the articles 12 leave the exit 18 of the feedscrews 15 and 16 with spacing between adjacent ones of the articles 12 that conforms to the pitch of the feedscrews 15 and 16, just right for the label applicator 14 or other processing station, the entrance 17 being that point along the feedscrews 15 and 16 where the crests 15b and 16b can first begin to capture the articles 12 and the exit being that point along the feedscrews 15 and 16 where the crests 15b and 16b finally fully release the article 12 previously captured. The feedscrews 15 and 16 may be dimensioned and arranged with an appropriate pitch and be rotated at an appropriate speed in a known manner to accomplish the desired spacing.

In order that the articles 12 are not trapped or caught between the crests 15b and 16b, it is desirable to maintain a jam-feed condition. Such a condition is shown in FIG. 1, the article that was the last to have entered the entrance 17 of the feedscrews 15 and 16 (designated 12′) abutting or at least nearly abutting the article 12 next in line to enter (designated 12″). Abutting in that way, the article 12′ holds back the article 12″ in such a way that the article 12″ will not be caught between the crests 15a and 16a. Thus, it is important that a gap does not exist between the article 12′ and the article 12″ when the article 12″ enters the entrance 17. However, gaps tend to occur for various reasons, one being that the normal operating rate of the feedscrews 15 and 16 (i.e., the rate at which the feedscrews 15 and 16 move the articles 12 toward the label applicator 14 or other processing station) is usually faster than the supply rate or the rate at which the articles 12 are supplied by the source 13 (one hundred articles per minute, for example).

According to a major aspect of the present invention, there is provided first sensing means for sensing the occurrence of a gap between any two adjacent articles 12 as the articles 12 are moved by the conveyor 11 means toward the feedscrews 15 and 16. That is accomplished in the feedscrew system 10 with a suitable sensing arrangement that may include such known components as a light emitting component 21 and a light sensitive component 22 mounted in a known way so that the articles 12 block a light path between the components 21 and 22 as the articles 12 move toward the entrance 17. Of course other sensing arrangements known in the art could be used instead. With the components 21 and 22, however, a gap between the two adjacent ones of the articles 12 results in the light path being unblocked so that light can travel from the light emitting component 21 to the light sensitive component 22, the component 22 then responding to the light to produce a signal indicative of the occurrence of the gap, the duration of which signal is related to the size of the gap. In that regard, the light emitting component 21 is powered in a known way and the signal produced by the light sensitive component 22 is coupled in a known way to control circuitry subsequently described.

The invention includes control means responsive to the first sensing means sensing the occurrence of such a gap for controlling the rate at which the feedscrews 15 and 16 operate in order to maintain a jam-feed condition. That is accomplished in the feedscrew system 10 by reducing the rate at which the feedscrews 15 and 16 operate from a normal operating rate to a reduced operating rate that is slower than the rate the articles 12 are being supplied by the source 13 (one-half the normal rate, for example) and by stopping the feedscrews 15 and 16 if the gap exceeds a predetermined size. In other words, the first corrective attempt to restore a jam-feed condition undertaken by the feedscrew system 10 involves slowing down the feedscrews 15 and 16. If that is insufficient to restore a jam-feed condition, the feedscrew system 10 stops the feedscrews 15 and 16 as a second corrective attempt.

In that regard, the feedscrew system 10 includes motor means for driving the feedscrews 15 and 16, such as a known type of electric motor 25 (FIG. 2), and clutch means for coupling the motor means to the feedscrews 15 and 16, such as a known type of electro-magnetic clutch 26 that is connected in a suitable known manner to the motor 25 and the feedscrews 15 and 16 (FIG. 2). In addition, the feedscrew system 10 includes suitable electronic circuitry that serves as a motor control 27 and suitable electronic circuitry that serves as a clutch control 28, the motor control 27 and the clutch control 28 employing known components and design techniques to control the motor 25 and the clutch 26 in response to the first sensing means as subsequently described.

One or two feedscrews may be used. When feedscrews are used as a matching pair, they must be synchronized at all times (with suitable adjustment to set and maintain synchronization). Therefore, the clutching means of starting and stopping rotation must be common to both sides (i.e., in that part of the drive system prior to the part that provides opposite rotation to the individual timing screws). When a single feedscrew is used, there exists a need to maintain synchronization to the conveyor(s) and subsequent possible downstream orientation devices timed to the conveyor and article position on the conveyor. Therefore, there is provided a single-tooth clutch as a necessary part of the drive/control system which ensures that the startup of the single screw will maintain the articles in exact synchronization with the conveyor(s) and timed orientation devices (included is a means for timing the single feedscrew to the conveyor(s) and orientation devices).

The feedscrews 15 and 16 normally operate at the normal operating rate previously mentioned, slightly faster than the rate at which the source 13 supplies the articles 12. When the components 21 and 22 sense a gap between adjacent ones of the articles 12, the component 22 produces the signal mentioned previously which is coupled by suitable means, such as a line 29, to the motor control 27 and the clutch control 28. Both the motor control 27 and the clutch control 28 are responsive to the signal, and if the gap is of sufficient size to be of concern (i.e., sufficient to cause other than a jam-feed condition), the motor control 27 reduces the speed of the motor 25 from a normal operating speed to a reduced operating speed, and that results in the rate at which the feedscrews 15 and 16 operate reducing from the normal operating rate to the reduced operating rate. Suitable known means, such as delay circuitry, may be employed in order to disregard gaps of no concern.

Thus, the motor control 27 serves as means for reducing the rate at which the feedscrews 15 and 16 operate, it being configured to reduce the speed of the motor means in the sense that it employs known components and design techniques to accomplish that function. It is also configured to cause the rate at which the feedscrews 15 and 16 operate to resume to the normal operating rate once a jam-feed condition has been restored, restoration of a jam-feed condition being indicated when sufficient time has elapsed at the reduced operating rate since the last occurrence of a gap. Then, the motor control 27 increases the speed of the motor 25 to a normal speed, thereby increasing the rate at which the feedscrews 15 and 16 operate to the normal operating rate.

However, if the gap turns out to be larger than a predetermined size, the articles 12 will not be able to catch up even if the feedscrews 15 and 16 are operated at the reduced operating rate. Therefore, when a gap larger than the predetermined size occurs the clutch control 28 disengages the clutch 26 so that the feedscrews 15 and 16 stop in order to permit the supply of articles to catch up and restore a jam-feed condition, suitable known circuitry, such as a timer, being employed in the clutch control 28 to determine if the gap is greater than the predetermined size.

Thus, the clutch control 28 serves as means for stopping the feedscrews 15 and 16 in order to reduce the rate at which the feedscrews 15 and 16 operate to zero, the clutch control 28 being configured to disengage the clutch 26. That can be done with circuitry responsive to the gap continuing for a predetermined period of time as an indication that gap size is larger than the predetermined size. In other words, the clutch control 28 is responsive to the continuation of the signal produced by the component 22 for more than a predetermined time interval. When that happens, it indicates that the gap is larger than the predetermined gap size so that the clutch control 28 stops the feedscrews until the signal indicates that the supply of articles 12 has caught up sufficiently to restore a jam-feed condition with the feedscrews operating. The clutch is then engaged to restart the feedscrews 15 and 16. A built-in electronic circuit in a main motor speed control can be provided to cause the motor 25 to slow down momentarily when the clutch 26 is re-engaged to insure a soft start. After a preset time delay, the feedscrew system 10 reverts to a full speed condition with the feedscrews 15 and 16 operating at the normal operating rate.

Preferably, the clutch control 28 disengages the clutch 26 only if the exit 18 of the feedscrews 15 and 16 is clear. In that regard, the feedscrew system 10 includes second conveyor means, such as a top holddown conveyor 30 (FIG. 2), that is located proximate the feedscrews 15 and 16. It functions in a known way to engage a top portion 31 of each of the articles 12 as each of the articles 12 moves out of the feedscrews 15 and 16 (i.e., as each of the articles 12 is about to leave the exit 18 of the feedscrews 15 and 16). According to another aspect of the invention, there is provided means for delaying disengagement of the clutch means when the top portion of an article 12 that is within the feedscrews 15 and 16 is engaged by the conveyor 30 until that one of the articles 12 is out of the feedscrews 15 and 16. That is accomplished in the feedscrew system 10 with a second suitable sensing arrangement for sensing an article within the feedscrews 15 and 16 that is engaged by the conveyor 30.

The second sensing arrangement may include known components generally similar to those employed for the first sensing arrangement described previously, such as a light emitting component 32 and a light sensitive component 33 mounted in a known way so that when an exiting one of the articles 12 is engaged by the conveyor 30 while it is still within the feedscrews 15 and 16, the exiting article 12 blocks a light path between the components 32 and 33. In that regard, the light emitting component 32 is powered in a known way and the signal produced by the light sensitive component 32 is coupled in a known way to the clutch control 28, such as by a line 34 in FIG. 2. When the exiting article 12 blocks the light path, there occurs a change in the signal coupled to the clutch control 28. The clutch control 28 is configured to be responsive to such a change in that signal and delay disengagement of the clutch 26 for a sufficient length of time to allow the exiting article 12 to move out of the feedscrews 15 and 16. In other words, the clutch control 28 is configured to delay disengagement of the clutch means in response to the second sensing arrangement sensing an article within the feedscrew that is engaged by the second conveyor means until the article is out of the feedscrew. Of course, other sensing arrangements may be employed within the inventive concepts disclosed, such as sensing a mark on one of the feedscrews 15 and 16 that indicates the feedscrew is in a position such that no exiting article 12 is still within the feedscrews.

The invention includes a method of controlling a feedscrew system having conveyor means for moving articles and feedscrew means for spacing the articles. The method comprises the steps of providing first sensing means for sensing the occurrence of a gap between any two adjacent articles as the articles move toward the feedscrew means and controlling the rate at which the feedscrew means operates in response to the first sensing means sensing the occurrence of such a gap in order to maintain a jam-feed condition. The feedscrew system may include motor means for driving the feedscrew means, and the step of controlling the rate at which the feedscrew means operates may include reducing the speed of the motor means. In addition, the feedscrew system may include clutch means for coupling the drive motor to the feedscrew means, and the step of controlling the rate at which the feedscrew means operates may include disengaging the clutch means in order to stop the feedscrew means. Furthermore, the feedscrew system may include second conveyor means for engaging a top portion of each of the articles as each of the articles moves out of the feedscrew means, and the step of controlling the rate at which the feedscrew operates may include delaying disengagement of the clutch means when the top portion of an article within the feedscrew is engaged by the second conveyor means until the article is out of the feedscrew.

Thus, the invention provides a feedscrew system in which the feedscrew speed is varied to offset the occurrence of a gap in the line of articles being supplied to the entrance end. In that way, it maintains a jam-feeding condition so that damage and injury are less likely. Although an exemplary embodiment of the invention has been shown and described, many changes, modifications, and substitutions may be made by one having ordinary skill in the art without necessarily departing from the spirit and scope of the invention.

What is claimed is:

1. A feedscrew system, comprising:
   conveyor means for moving articles from a source of the articles toward a processing station;
   feedscrew means for spacing the articles, the feedscrew means including at least one feedscrew located proximate the conveyor means, the feedscrew having an entrance and an exit;
   first sensing means for sensing the occurrence of a gap between any two adjacent articles as the articles are moved by the conveyor means toward the feedscrew; and
   control means responsive to the first sensing means sensing the occurrence of such a gap for controlling the rate at which the feedscrew operates in order to maintain a jam-feed condition;
   the control means including means for stopping the feedscrew in order to reduce the rate at which the feedscrew operates to zero;
   motor means for driving the feedscrew and clutch means for coupling the motor means to the feedscrew;
   the means for stopping the feedscrew is configured to disengage the clutch means in order to reduce the rate at which the feedscrew operates to zero if the gap continues for a predetermined period of time;
   second conveyor means located proximate the feedscrew for engaging a top portion of each of the articles as each of the articles moves out of the feedscrew; and
   means for delaying disengagement of the clutch means when the top portion of an article within the feedscrew is engaged by the second conveyor means until the article is out of the feedscrew.

2. A system as recited in claim 1, wherein the control means includes means for reducing the rate at which the feedscrew operates from a normal operating rate to a reduced operating rate when the occurrence of such a gap is sensed.

3. A system as recited in claim 2, wherein the articles are received by the conveyor means from the source of articles at a given supply rate, the normal operating rate at which the feedscrew operates is greater than the given supply rate, and the reduced operating rate is less than the given supply rate.

4. A system as recited in claim 2, wherein the means for reducing the rate at which the feedscrew operates is configured to reduce the speed of the motor means.

5. A system as recited in claim 2, wherein the means for reducing the rate at which the feedscrew operates is configured to cause the rate at which the feedscrew operates to resume to the normal operating rate once a jam-feed condition has been restored.

6. A system as recited in claim 1, wherein:
   the means for delaying disengagement of the clutch means includes second sensing means for sensing an article within the feedscrew that is engaged by the second conveyor means; and
   the means for stopping the feedscrew is configured to delay disengagement of the clutch means in response to the second sensing means sensing an article within the feedscrew that is engaged by the second conveyor means until the article is out of the feedscrew.

7. A system as recited in claim 1, wherein the separate processing station includes a label applicator.

8. A system as recited in claim 7, wherein the label applicator is configured to apply pressure sensitive labels.

9. A feedscrew system, comprising:
   conveyor means for moving articles;
   feedscrew means for spacing the articles;
   means for driving the feedscrew means;
   first sensing means for sensing the occurrence of a gap between any two adjacent articles as the articles move toward the feedscrew means;
   means responsive to the first sensing means sensing the occurrence of such a gap for stopping the feedscrew in order to maintain a jam-feed condition;
   the driving means including motor means for driving the feedscrew means and clutch means for coupling the drive motor to the feedscrew means;
   the means for stopping the feedscrew disengaging the clutch means in order to reduce the rate at which the feedscrew operates to zero;
   second conveyor means for engaging a top portion of each of the articles as each of the articles moves out of the feedscrew means; and
   means for delaying disengagement of the clutch means when the top portion of an article within the feedscrew means is engaged by the second conveyor means until the article is out of the feedscrew means.

10. A system as recited in claim 9, wherein:
    the means for delaying disengagement of the clutch means includes second sensing means for sensing an article within the feedscrew that is engaged by the second conveyor means; and
    the means for stopping the feedscrew delays disengagement of the clutch means in response to the second sensing means sensing an article within the feedscrew that is engaged by the second conveyor means until the article is out of the feedscrew.

11. A method of controlling a feedscrew system having conveyor means for moving articles and feedscrew means for spacing the articles, the method comprising:

providing first sensing means for sensing the occurrence of a gap between any two adjacent articles as the articles move toward the feedscrew means;

controlling the rate at which the feedscrew means operates in response to the first sensing means sensing the occurrence of such a gap in order to maintain a jam-feed condition;

the feedscrew system including motor means for driving the feedscrew means and clutch means for coupling the drive motor to the feedscrew means;

the step of controlling the rate at which the feedscrew means operates including stopping the feedscrew means by disengaging the clutch means in order to stop the feedscrew means;

the feedscrew system including second conveyor means for engaging a top portion of each of the articles as each of the articles moves out of the feedscrew means; and the step of stopping including delaying disengagement of the clutch means when the top portion of an article within the feedscrew is engaged by the second conveyor means until the article is out of the feedscrew means.

12. A method as recited in claim 11, wherein the step of providing includes providing second sensing means for sensing an article within the feedscrew means that is engaged by the second conveyor means.

13. A feedscrew system, comprising:

conveyor means for moving articles from a source of articles toward a processing station;

feedscrew means for feeding the articles on the conveyor means toward the processing station, said feedscrew means having an entrance and an exit;

means for driving the feedscrew means so that the feedscrew means can feed the articles toward the processing station;

said conveyor means moving articles toward the feedscrew means so as to tend to create a jam-feed condition leading to the feedscrew means;

means responsive to a gap between adjacent articles at a location upstream of the feedscrew means for stopping the feedscrew means;

movable means for engaging each of the articles as each of the articles moves out of the feedscrew means; and means for delaying the stopping of the feedscrew means by the stopping means when an article within the feedscrew means is engaged by the movable means until such article is out of the feedscrew means.

14. A system as recited in claim 13 including means responsive to a gap between adjacent articles at said location for reducing the speed of the feedscrew means and said stopping means is responsive to the existence of a gap at said location for a predetermined period of time to stop the feedscrew.

15. A system as recited in claim 13 wherein the movable means includes a top holddown conveyor for engaging a top portion of each of the articles as each of the articles moves out of the feedscrew means.

16. A system as recited in claim 13 wherein the delaying means includes a sensor for sensing an article in the feedscrew means which is engaged by the moveable means.

17. A system as recited in claim 16 wherein the movable means includes a top holddown conveyor for engaging a top portion of each of the articles as each of the articles moves out of the feedscrew means.

18. A system as recited in claim 13 wherein the processing station includes a label applicator.

* * * * *